US008996266B2

(12) United States Patent
Hultengren et al.

(10) Patent No.: US 8,996,266 B2
(45) Date of Patent: Mar. 31, 2015

(54) DUAL CLUTCH TRANSMISSION VEHICLE LAUNCH CONTROL

(71) Applicant: GM Global Technology Operations LLC, Detroit, MI (US)

(72) Inventors: Colin Hultengren, New Hudson, MI (US); Craig J. Hawkins, Howell, MI (US); Matthew D. Whitton, Howell, MI (US); Crystal Nassouri, West Bloomfield, MI (US); Jonathan P. Kish, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/916,752

(22) Filed: Jun. 13, 2013

(65) Prior Publication Data

US 2014/0195129 A1    Jul. 10, 2014

Related U.S. Application Data

(60) Provisional application No. 61/749,592, filed on Jan. 7, 2013.

(51) Int. Cl.
*F16D 13/00* (2006.01)
*F16H 61/06* (2006.01)
*F16H 61/04* (2006.01)

(52) U.S. Cl.
CPC .............. *F16D 13/00* (2013.01); *F16H 61/061* (2013.01); *F16H 61/04* (2013.01); *F16D 2500/50224* (2013.01)
USPC .................... 701/60; 701/51; 701/54; 701/56; 701/61; 701/67; 477/62; 477/77; 477/166

(58) Field of Classification Search
CPC ... B60W 10/00; B60W 10/02; B60W 10/023; B60W 10/10; B60W 2050/0008; B60W 2710/02; B60W 2710/027; F16D 11/00; F16D 13/00; F16D 25/00; F16D 25/10; F16D 41/00; F16D 43/00
USPC .............. 701/51, 54–68; 477/62, 77–91, 115, 477/116, 166
See application file for complete search history.

(56) References Cited

U.S. PATENT DOCUMENTS 8,033,957 B2 * 10/2011 Minami ......................... 477/180
8,260,513 B2 * 9/2012 Shelton et al. ................... 701/68
8,550,961 B2 * 10/2013 Jiang et al. ..................... 477/175
(Continued)

*Primary Examiner* — Thomas Tarcza
*Assistant Examiner* — Tyler J Lee
(74) *Attorney, Agent, or Firm* — Quinn Law Group, PLLC

(57) ABSTRACT

A vehicle includes an engine, an engine control module (ECM), and a dual clutch transmission (DCT) assembly. The DCT assembly has first and second input clutches, first and second gear sets selectively connected to the engine via the respective first and second input clutches, and a transmission control module (TCM). In executing a launch control method, the TCM receives a launch request, receives an actual engine torque, and determines the inertia and acceleration of the engine. The TCM then calculates a clutch torque for the particular input clutch used for vehicle launch as a function of the actual engine torque and the product of the inertia and the acceleration, compares the calculated clutch torque to the commanded clutch torque, modifies a torque-to-position (TTP) table depending on the comparison result, and transmits a clutch position signal to the designated input clutch to command an apply position extracted from the TTP table.

16 Claims, 2 Drawing Sheets

(56) References Cited

U.S. PATENT DOCUMENTS

| | | | |
|---|---|---|---|
| 8,571,767 B2 * | 10/2013 | Porta et al. | 701/51 |
| 8,721,499 B2 * | 5/2014 | Kim et al. | 477/180 |
| 2013/0297157 A1 * | 11/2013 | Pietron et al. | 701/51 |
| 2014/0087918 A1 * | 3/2014 | Kim et al. | 477/180 |

* cited by examiner

DUAL CLUTCH TRANSMISSION VEHICLE LAUNCH CONTROL

CROSS-REFERENCE TO RELATED APPLICATIONS

This application claims the benefit of U.S. Provisional Application No. 61/749,592, filed on Jan. 7, 2013, which is hereby incorporated by reference in its entirety.

TECHNICAL FIELD

This disclosure relates to the launch control of a vehicle having a dual clutch transmission.

BACKGROUND

Dual clutch transmissions combine certain features of manual and automatic transmissions. In a dual clutch transmission or DCT having oddly-numbered and evenly-numbered gear sets, one of a pair of input clutches is applied to engage any of the oddly-numbered gear sets. Likewise, the other input clutch is applied to engage any of the evenly-numbered gear sets. An onboard transmission controller predicts the next-selected gear using available control inputs such as engine acceleration and braking levels, and then commands an engagement of the next gear ahead of the impending shift. Relative to a conventional transmission, a DCT can provide faster gear shifts, typically with improved shift control and increased power.

The two available input clutches in a wet DCT are cooled and lubricated by transmission fluid circulated via an engine-driven or auxiliary fluid pump. In a dry DCT (dDCT), the various gear sets within a gearbox of the DCT are cooled and lubricated in the same manner while the two input clutches remain dry. As a result, a dDCT may experience a greater amount of temperature-related performance variation relative to a wet DCT.

SUMMARY

A vehicle is disclosed herein that includes a dual clutch transmission (DCT) and a transmission control module (TCM). The TCM is operable to execute a launch control method of the present invention. The method may be used in the launch control of any DCT, whether of the dry or wet variety as described above. In the example embodiments disclosed herein, an engine control module (ECM) and the TCM work together during vehicle launch to ultimately calculate and modify, over time, a position control signal used for controlling a position of a designated one of the input clutches of the DCT. The position signal ultimately commands an apply position of the designated input clutch, i.e., an axial position of the piston or other actuator(s) used for applying the input clutch. A goal of the present approach is to achieve a vehicle launch having a smooth, consistent feel.

In a particular embodiment, the vehicle includes an engine and a DCT assembly. The DCT assembly includes the TCM and first and second input clutches. The first and second input clutches connect the engine to respective first and second gear sets of the DCT. The vehicle also includes the ECM as noted above. The ECM extracts, calculates, or otherwise provides an actual engine torque value. The TCM, which is in communication with the input clutches and the ECM, receives a launch request from the ECM whenever a driver of the vehicle depresses an accelerator pedal through a sufficient range or percentage of travel.

In response to the received launch request, the TCM next derives a calculated clutch torque ($T_{CALC}$) as a function of the engine torque ($T_E$) and an inertial torque value, the latter of which may be determined as the product of the acceleration (a) and known inertia (I) of the engine. The TCM then compares the calculated clutch torque value to a commanded clutch torque, e.g., a signal from the TCM. Any deviation between engine torque and calculated torque is used to perform closed-loop control on the clutch position, such that the engine torque and calculated torque are caused to merge. The TCM may modify a recorded torque-to-position (TTP) table in memory such that, when the calculated clutch torque exceeds the commanded clutch torque, less clutch torque corresponds in the TTP table to a given apply position of the designated input clutch, and such that more clutch torque corresponds in the TTP table to the given apply position whenever the calculated clutch torque is less than the commanded clutch torque. The TCM then transmits a clutch position signal to the designated input clutch to thereby command an apply position of the input clutch that is extracted from the recorded TTP table.

A DCT system is also disclosed for a vehicle having an engine and an ECM. The DCT system includes first and second input clutches, first and second gear sets, and a TCM. The first gear set is selectively connected to the engine via the first input clutch. Likewise, the second gear set is selectively connected to the engine via the second input clutch. The TCM, which is in communication with the ECM, receives a launch request, and in response thereto, receives an actual engine torque and determines acceleration and inertia values of the engine. The TCM then derives the calculated clutch torque by subtracting the product of the acceleration and inertia values from the actual engine torque, and compares the calculated clutch torque to the commanded clutch torque. The TTP table is adapted as noted above based on this difference, and the TCM transmits a clutch position signal to the designated input clutch to command an apply position of the input clutch, with the position extracted from the recorded TTP table.

An associated launch control method for the vehicle described above is also disclosed. The method includes receiving a launch request via the TCM, receiving an actual engine torque from the ECM, determining engine acceleration and inertia, and then calculating a clutch torque for a designated input clutch of the first and second input clutches as a function of the actual engine torque and the acceleration and inertia values. The method also includes comparing the calculated clutch torque to the commanded clutch torque, and transmitting a corresponding closed-loop position signal to the designated input clutch to thereby increase or decrease a clutch apply position of the designated input clutch depending on the results of this comparison.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
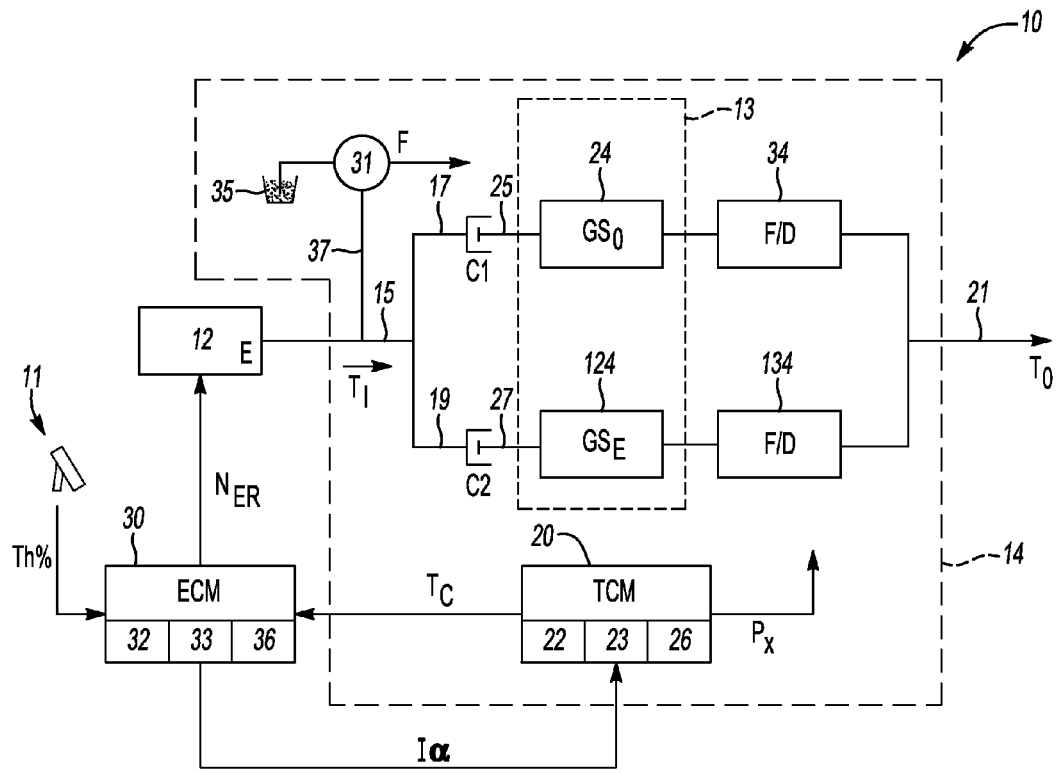
FIG. 1 is a schematic illustration of a vehicle having a dual clutch transmission (DCT) with a clutch position that is controlled during vehicle launch using a launch control method as described herein.

Referring to the drawings, wherein like reference numbers refer to like components throughout the several Figures, a vehicle 10 is shown schematically in FIG. 1. The vehicle 10 includes an internal combustion engine 12 and a dual clutch transmission (DCT) assembly 14, with the engine (E) 12. The speed of the engine 12 is responsive to a received throttle request (arrow Th %), e.g., a force or a percentage of travel of an accelerator pedal 11 or other suitable device indicating a relative level of requested engine torque. Such a force/travel may be detected via a sensor (not shown) in the conventional manner. In response to receipt of the throttle request (arrow Th %), the engine 12 generates input torque (arrow $T_I$) to the DCT assembly 14 and delivers the input torque (arrow $T_I$) to the DCT assembly 14 via a rotatable drive member 15.

As is well understood in the art, a DCT is an automated, manual-like transmission having a gearbox 13 with two independently-operated input clutches, i.e., the respective first and second input clutches C1 and C2 shown in FIG. 1. While omitted from FIG. 1 for illustrative simplicity, each input clutch C1 and C2 may include a center plate containing any number of friction discs, friction plates, or other suitable friction materials. The input clutches C1 and C2 of the DCT assembly 14 may be lubricated/wet, or it may be dry, with both designs described hereinabove. That is, fluid (arrow F) may be circulated by an engine-driven fluid pump 31 to the input clutches C1, C2 in a wet DCT embodiment, or the fluid (arrow F) may be circulated only to the gearbox 13 in a dry DCT embodiment. Associated electronic and hydraulic clutch control devices (not shown) ultimately control the shift operation and vehicle launch in response to instructions from various onboard controllers as explained in detail below.

In the example DCT assembly 14 of FIG. 1, the first input clutch C1 controls all oddly numbered gear sets 24 ($GS_O$) of the DCT assembly 14, for instance first, third, fifth, and seventh gears in an example 7-speed transmission, while the second input clutch C2 controls any evenly numbered gear sets 124 ($GS_E$), e.g., second, fourth, and sixth in the same example 7-speed transmission. Within each of the gear sets 24, 124, additional clutches, e.g., hydraulic piston-actuated rotating or braking clutches, may be engaged or disengaged as needed to establish the desired gear state. The reverse gear state may be part of the oddly numbered gear set 24 and controlled via the first input clutch C1. Using this type of gear arrangement, the DCT assembly 14 can be rapidly shifted through its available range of gears without completely interrupting the power flow from the engine 12.

The controllers of the vehicle 10 shown in FIG. 1 include at least a transmission control module (TCM) 20 and an engine control module (ECM) 30. As set forth in detail below with reference to FIGS. 2-4, the TCM 20 works in conjunction with the ECM 30 during launch of the vehicle 10 to thereby institute engine acceleration-based, closed-loop position control over any actuators of the designated input clutch, e.g., clutch pistons. Typically, the input clutch C1 would be used for a $1^{st}$ gear launch, although launches in other states are not precluded, and thus input clutch C2 could be controlled in the same manner. For a dry DCT, the present launch control approach may help address the fundamental variations to improve launch quality. Although such variation is typically prevalent in a dry DCT due to the lack of cooling at the friction interfaces of the input clutches, launch of a vehicle having a wet DCT may also benefit from the present invention.

In the example vehicle 10 of FIG. 1, the DCT assembly 14 also includes an output shaft 21 that is connected to a set of drive wheels (not shown). The output shaft 21 ultimately transmits output torque (arrow $T_O$) to the drive wheels to propel the vehicle 10. The DCT assembly 14 may include a first shaft 25 connected to the first input clutch C1, a second shaft 27 connected to the second input clutch C2, and respective odd and even gear sets 24, 124 ($GS_O$, $GS_E$) located within the gearbox 13, both of which may be cooled and lubricated via circulation of transmission fluid from a sump 35 via an engine-driven main pump 31, e.g., via a pump shaft 37, or alternatively via an auxiliary pump (not shown).

Within the DCT assembly 14, the first shaft 25 is connected to and drives only the odd gear sets 24 ($GS_O$). The second shaft 27 is connected to and drives only the even gear sets 124 (GSE), including a reverse gear set. The DCT assembly 14 further includes upper and lower main shafts 17 and 19, respectively, which are connected to final drive (F/D) gear sets 34, 134. The final drive gear sets 34 and 134 in turn are connected to the output shaft 21 of the DCT assembly 14, and are configured to provide any required final gear reduction.

With reference to the controllers of the vehicle 10, the TCM 20 and the ECM 30 may be configured as a microprocessor-based devices having elements such as processors 22, 32, memory 23, 33 including but not necessarily limited to tangible, non-transitory computer-readable media such as read only memory (ROM), optical memory, solid state flash memory, and the like, as well as random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers 26, 36, and the necessary input/output (I/O) devices and other signal conditioning and/or buffer circuitry.

Figure 5:
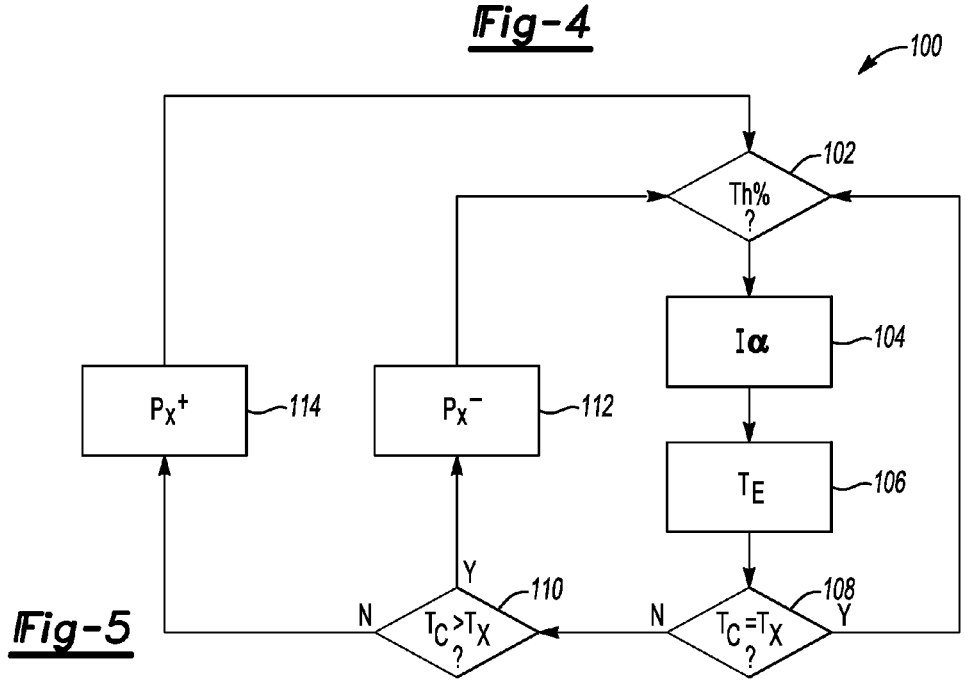
FIG. 5 is a flow chart describing an example embodiment of a vehicle launch control method for the vehicle shown in FIG. 1, or for any other vehicle having a wet or a dry DCT as part of its powertrain.

The TCM 20 and ECM 30 are programmed to execute the required steps of the launch control method, an example of which is shown at 100 in FIG. 5, with the TCM 20 in particular providing proportional, integral, derivative (PID)-based position control over the operation of a designated input clutch C1 or C2 throughout the duration of a launch of the vehicle 10. As part of the present launch control method, the ECM 30 may generate various control values, including an engine speed request (arrow $N_{ER}$) for control of the engine 12 and an engine acceleration value (arrow Iα), the latter of which is transmitted to the TCM 20 for use in a calculation by the TCM 20 of what is referred to hereinafter as a calculated clutch torque. Ultimately, the TCM 20 uses the engine acceleration value (arrow Iα), specifically the variance between engine torque and the calculated clutch torque, in maintaining closed-loop position control over the input clutch C1 or C2, and outputs a position control signal (arrow Px) to the designated input clutch C1 or C2 to thereby control the position of the designated input clutch C1 or C2 in the manner described below.

Figure 2:
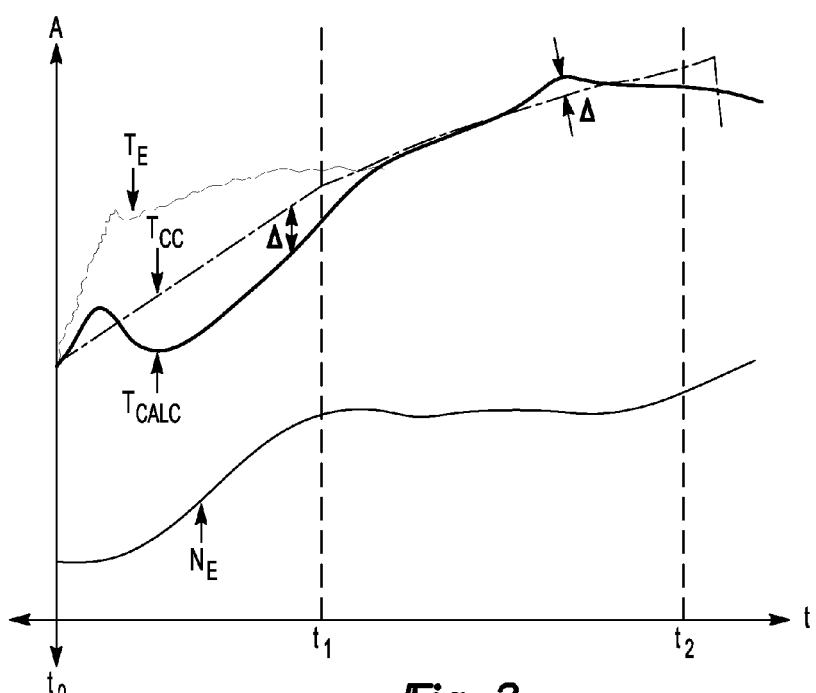
FIG. 2 is a set of time plots describing the changing amplitudes of various vehicle performance values, with time plotted on the horizontal axis and amplitude plotted on the vertical axis.

Referring to FIG. 2, a set of traces 50 describes various performance characteristics during a launch of the vehicle 10 shown in FIG. 1. In each of the traces, signal amplitude (A) is plotted on the vertical axis and time (t) is plotted on the horizontal axis. At time $t_0$, a driver of the vehicle 10 requests a launch by depressing the accelerator pedal 11. In response to the increased throttle request, a corresponding engine speed request is generated by the ECM 30, e.g., with the engine speed request being proportional to the throttle request (trace Th % of FIG. 1).

As the engine speed request is transmitted to the engine 12 by the ECM 30, the various actuators of the engine 12 are controlled as needed by the ECM 30 so as to provide a calibrated rate of engine acceleration. Actual engine torque (trace $T_E$) rises, with most of this torque initially doing the work of increasing engine speed (trace $N_E$). As is understood in the art, engine actuators may include, for instance, spark plugs and/or cylinders of the engine 12, with the ECM 30 controlling engine speed (trace $N_E$) by controlling spark/ignition, the number of active cylinders, etc.

Some of the actual engine torque ($T_E$) from the engine 12 is needed to overcome the inertia (I) of the engine 12, particularly at launch. Engine inertia (I) is used in closed-loop position control of the various engine actuators. Specifically, a calculated torque ($T_{CALC}$) may be derived by the TCM 20 as follows:

$$T_{CALC} = T_E - I\alpha$$

where $\alpha$ is the measured or calculated acceleration of the engine 12 and the other factors are described above. Any difference between the commanded clutch torque ($T_{CC}$) from the TCM 20 and the calculated clutch torque ($T_{CALC}$) derived as set forth above is used to perform closed-loop correction on the clutch position over the designated input clutch C1 or C2 of the DCT assembly 14 shown in FIG. 1, with possible adjustment to a TTP table recorded in or accessible by the TCM 20.

In FIG. 2, engine speed ($N_E$) rises sharply upon depression of the accelerator pedal 11 before stabilizing at around $t_1$. Engine torque ($T_E$) mainly does the work of increasing engine speed ($N_E$) in this initial interval of $t_0$-$t_1$. At this launch stage, a high engine torque ($T_E$) minus a large calculated inertia torque value (I$\alpha$) results in low calculated torque ($T_{CALC}$). As engine speed ($N_E$) reaches a calibrated target, e.g., at around $t_1$, engine torque ($T_E$) may drop to slow the engine 12, or there may be sufficient clutch torque ($T_{CC}$) to stop the acceleration of the engine 12. The calculated torque ($T_{CALC}$) rises to meet the commanded clutch torque ($T_{CC}$). Any deviation ($\Delta$) of the calculated clutch torque ($T_{CALC}$) from the commanded clutch torque ($T_{CC}$) causes the TCM 20 to institute closed-loop control over clutch position, with the goal of having $T_{CALC}$ and $T_{CC}$ match.

The commanded clutch torque (trace $T_{CC}$) may be provided as a calibration value from the TCM 20, e.g., extracted from a lookup table or a torque model recorded in memory 23. The TCM 20 thus monitors actual engine torque (trace $T_E$) and the engine inertial torque I$\alpha$) to determine precisely how much load is acting on the input clutch C1 or C2 of the DCT assembly 14 of FIG. 1 during launch, and then adjusts the position signal (trace Px of FIG. 3) as needed over time.

Figure 3:
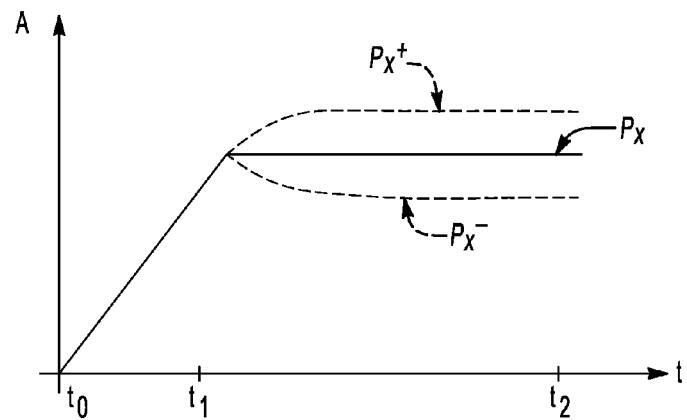
FIG. 3 is a time plot of an example clutch position control signal for an input clutch of the DCT shown in FIG. 1, with time plotted on the horizontal axis and amplitude plotted on the vertical axis.

Referring to FIG. 3, the clutch position signal (trace $P_X$) is generated by the TCM 20 of FIG. 1 and transmitted to the particular input clutch C1 or C2 of FIG. 1 that is being used to control the vehicle launch. As used herein, an "increased" clutch position signal is any position signal or command which results in movement of a clutch apply piston or other actuator in an apply direction of the input clutch C1 or C2, and thus is a signal that results in an increase in clutch torque. Likewise, a "decreased" clutch position signal results in movement of a clutch apply piston or other actuator in the release direction, and thus is a signal that results in reduced clutch torque.

In an example control action in which a calculated clutch torque exceeds the commanded clutch torque from the TCM 20, the clutch position signal (trace $P_X$) may be modified downward to form trace $P_X^-$. A control action in which the calculated clutch torque is less than the commanded clutch torque, the clutch position signal (trace $P_X$) may be adjusted upward to form trace $P_X^+$. At about $t_2$ of FIGS. 2 and 3, the designated input clutch C1 or C2 reaches synchronous speed, and the vehicle 10 is fully launched, typically in first gear.

Figure 4:
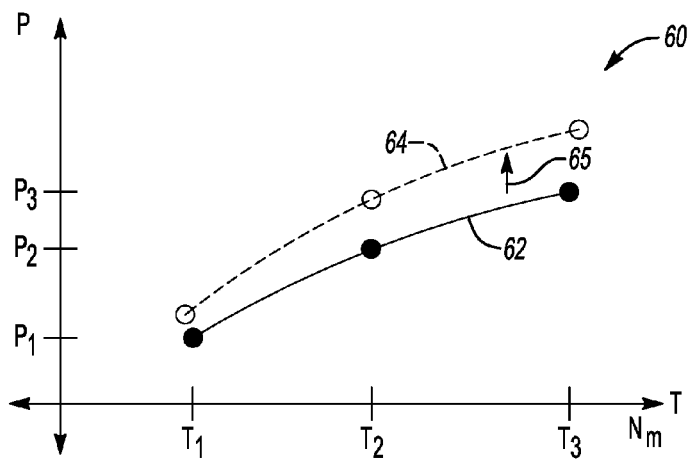
FIG. 4 is an example torque-to-position model usable with the vehicle of FIG. 1, with commanded clutch torque plotted on the horizontal axis and clutch position plotted on the vertical axis.

Adjustment of the clutch position signal (trace $P_X$) of FIG. 3 may result in the automatic modification of a recorded torque to position (TTP) table 60, an example of which is shown in FIG. 4, with torque (T) plotted on the horizontal axis and position (P) plotted on the vertical axis. The embodiment of FIG. 4 is a simple three-position TTP model that may be recorded in the memory 23 of the TCM 20 shown in FIG. 1. Such a table may be used by the TCM 20 to determine precisely how much torque (T) to command for a given clutch position (P), and vice versa. The TTP table 60 may include a calibrated minimum torque $T_1$, a calibrated mid-level torque $T_2$, and a calibrated maximum torque $T_3$, which together are illustrated as a TTP trace 62. Each torque value corresponds to a respective minimum, mid-level, or maximum clutch position $P_1$, $P_2$, or $P_3$. Thus, as part of a possible control action, the TCM 20 may modify or adapt the TTP table 60 over time, e.g., upward in the direction of arrow 65 as shown to form an adapted TTP trace 64, which can be recorded for use in the next shift.

Referring to FIG. 5, an example method 100 for controlling a launch of the vehicle 10 shown in FIG. 1 begins at step 102, wherein the ECM 30 of FIG. 1 receives a throttle signal (arrow Th %) indicating that a driver of the vehicle 10 has depressed the accelerator pedal 11 with sufficient force to thereby request a launch of the vehicle 10. The method 100 proceeds to step 104 when the throttle signal (arrow Th %) has been detected.

Step 104 entails deriving the clutch torque ($T_{CALC}$) as explained above, such as via the product of the known inertia (I) and measured or calculated acceleration (a) of the engine 12. The inertia (I) may be a calibrated value that is recorded in memory 23 of the TCM 20. The acceleration ($\alpha$) may be determined using any suitable approach, e.g., by calculation of the rate of change of a measured engine speed signal or by direct measurement. The calculated clutch torque ($T_{CALC}$) is recorded, and the method 100 thereafter proceeds to step 108.

At step 106, the actual engine torque (trace $T_E$ of FIG. 2) is determined. Such a value may be available from a torque model recorded in memory 33 of the ECM 30 in a particular embodiment. Thus, for any given speed point, the torque being output by the engine 12 is known and reported to the TCM 20, such as over a controller area network (CAN) bus.

At step 108, the TCM 20 next determines whether a commanded clutch torque, i.e., trace $T_{CC}$ of FIG. 2, is equal to the calculated clutch torque ($T_{CALC}$) from step 104, or is at least within a small calibrated range of the calculated clutch torque ($T_{CALC}$). If so, adjustment to the clutch position signal (trace $P_X$ of FIG. 3) is not required, and the method 100 repeats step 102. Steps 102-108 may continue in a loop until an exit condition signals a shift to steady-state control, typically indicating the completion of the launch once the input clutch reaches synchronous speed. If the commanded clutch torque (trace $T_{CC}$ of FIG. 2) is not equal to the calculated clutch torque ($T_{CALC}$), the method 100 proceeds instead to step 110.

Step 110 includes determining, via the TCM 20, whether the commanded clutch torque (trace $T_{CC}$) exceeds the calculated clutch torque ($T_{CALC}$) from step 104. If so, the method 100 proceeds to step 112. Otherwise, the method 100 proceeds to step 114.

At step 112, the TCM 20 may adjust the clutch position signal (trace $P_X$ of FIG. 3) downward, i.e., decreases the clutch position signal by a calibrated amount such that less clutch torque is applied for that position. Step 112 may entail adapting a TTP table, e.g., the example TTP table 60 of FIG. 4. The amount of adjustment may be limited by dead bands or other suitable limits to avoid over-adjustment of the TTP model. For example, position may be reduced by no more than 0.5 mm in each control loop in one possible approach, or by less than 2 mm in another embodiment. The method 100 returns to step 102 after adjusting the position signal (trace $P_X$ of FIG. 2).

At step 114, the TCM 20 adjusts the clutch position signal (trace $P_X$ of FIG. 3) upward, i.e., increases the clutch position signal by a calibrated amount such that more clutch torque is applied for that position. As with step 112, step 114 may entail modifying/adapting the TTP table 60 of FIG. 4 by a small calibrated amount. The method 100 returns to step 102 after adjusting the clutch position signal (trace $P_X$ of FIG. 2) or the TTP table 60.

Using the method 100 set forth hereinabove, the TCM 20 of FIG. 1 can blend an engine speed request by requesting spark retard or throttle control from the ECM 30 to match the acceleration rate of the vehicle 10. In other words, the calculated torque described above is transmitted to the ECM 30 as a feed-forward control term. In this manner, the feel of the launch is improved relative to conventional approaches. The TCM 20, via PID-based closed-loop clutch position control during the entire launch, ensures that command clutch torque of the input clutch C1 or C2 matches the calculated clutch torque as closely as possible. The present approach will help to prevent the TCM 20 from commanding a clutch torque at too high of a level, which could cause unwanted engine pull down. Such an approach may better handle any variation in the actual TTP characteristics of a given DCT over time, e.g., of the DCT assembly 14 of FIG. 1, while still allowing maximum output torque through the launch as engine torque capacity increases.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
    an engine;
    an engine control module (ECM) in communication with the engine, wherein the ECM provides an actual engine torque value; and
    a dual clutch transmission (DCT) assembly having first and second input clutches, first and second gear sets selectively connected to the engine via the respective first and second input clutches, and a transmission control module (TCM) in communication with the DCT assembly and the ECM, and having a calibrated torque-to-position (TTP) table for the first and second input clutches;
    wherein the TCM is configured to:
        receive a launch request of the vehicle;
        receive the actual engine torque value from the ECM;
        determine an inertial torque value as the product of an acceleration of the engine and an inertia of the engine;
        calculate a clutch torque for a designated one of the first and second input clutches as a function of the actual engine torque value and the inertial torque value;
        calculate a difference between the calculated clutch torque to a commanded clutch torque to the designated input clutch; and
        provide closed-loop control over a position of the designated input clutch using the difference as a feedback term, including modifying the TTP table and transmitting a modified clutch position signal to the designated input clutch.

2. The vehicle of claim 1, wherein the controller is configured to modify the TTP table such that less clutch torque corresponds in the TTP table to a given apply position of the designated first or second input clutch when the calculated clutch torque exceeds the commanded clutch torque, and such that more clutch torque corresponds in the TTP table to the given apply position when the calculated clutch torque is less than the commanded clutch torque.

3. The vehicle of claim 1, wherein the ECM includes a recorded torque model and is configured to extract the actual engine torque value from the recorded torque model.

4. The vehicle of claim 1, wherein the first gear set establishes the oddly numbered gears of the DCT assembly, and the first input clutch is the designated input clutch for the launch.

5. The vehicle of claim 1, wherein the DCT assembly is a dry DCT assembly that is characterized by an absence of a circulation of cooling or lubricating fluid to the first and second input clutches.

6. The vehicle of claim 1, wherein the TCM is configured to detect when the input clutch reaches a synchronous speed, and to transition to steady-state control of the designated input clutch in first gear when the input clutch reaches the synchronous speed.

7. A dual-clutch transmission (DCT) assembly for a vehicle having an engine with an engine control module (ECM), the DCT assembly comprising:
    a first and a second input clutch;
    a first and a second gear set, wherein the first and second gear sets are selectively connected to the engine via the respective first and second input clutches; and
    a transmission control module (TCM) in communication with the ECM, wherein the TCM is configured to receive a launch request, and in response to the received launch request is further configured to:
        receive the actual engine torque value from the ECM;
        determine an inertia and an acceleration of the engine;
        calculate a clutch torque for a designated one of the first and second input clutches as a function of the actual engine torque value and the product of the inertia and acceleration of the engine;
        compare the calculated clutch torque to a commanded clutch torque for the designated input clutch;
        modify a recorded torque to position (TTP) table such that less clutch torque corresponds in the TTP table to a given apply position of the designated input clutch when the calculated clutch torque exceeds the commanded clutch torque, and such that more clutch torque corresponds in the TTP table to the given apply position when the calculated clutch torque is less than the commanded clutch torque; and transmit a clutch position signal to the designated input clutch to thereby command an apply position extracted from the recorded TTP table.

8. The DCT assembly of claim 7, wherein the DCT assembly is a dry DCT assembly that is characterized by an absence of a circulation of cooling or lubricating fluid to the first and second input clutches.

9. The DCT assembly of claim 7, wherein the input clutches are in fluid communication with a fluid pump, and are lubricated and cooled via fluid discharged from the fluid pump.

10. The DCT assembly of claim 7, wherein the TCM is configured to detect when the designated input clutch reaches a synchronous speed, and to transition to steady-state control of the designated input clutch in first gear when the input clutch reaches the synchronous speed.

11. The DCT assembly of claim 7, wherein the first gear set establishes the oddly numbered gears of the DCT assembly, and the first input clutch is the designated input clutch for the launch.

12. A method for controlling the launch of a vehicle having an engine, and engine control module (ECM), a dual-clutch transmission (DCT) assembly having first and second input clutches and first and second gear sets selectively connected to the engine via the respective first and second input clutches, and a transmission control module (TCM), the method comprising:
receiving a launch request via the TCM;
receiving an actual engine torque value from the ECM;
determining an inertia and an acceleration of the engine;
calculating, via the TCM, a clutch torque for a designated input clutch of the first and second input clutches as a function of the actual engine torque value, the inertia, and the acceleration;
comparing the calculated clutch torque to a commanded clutch torque for the designated input clutch;
modifying the recorded TTP table such that less clutch torque corresponds in the TTP table to a given apply position of the designated input clutch when the calculated clutch torque exceeds the commanded clutch torque, and such that more clutch torque corresponds in the TTP table to the given apply position when the calculated clutch torque is less than the commanded clutch torque; and
transmitting a clutch position signal to the designated input clutch to thereby command an apply position extracted from the recorded TTP table.

13. The method of claim 12, wherein the vehicle includes an accelerator pedal, and wherein receiving a launch request includes receiving, via the TCM, a throttle request from the ECM in response to a movement of the accelerator pedal.

14. The method of claim 12, wherein the DCT assembly is a dry DCT assembly that is characterized by an absence of a circulation of cooling or lubricating fluid to the first and second input clutches.

15. The method of claim 12, further comprising:
detecting, via the TCM, when the designated input clutch reaches a synchronous speed; and
transitioning to steady-state control of the designated input clutch in first gear when the input clutch reaches the synchronous speed.

16. The method of claim 12, further comprising:
calculating the engine acceleration value, via the ECM, as the product of a calibrated inertia value of the engine and a calculated acceleration of the engine.

* * * * *